United States Patent [19]

Yanagi

[11] Patent Number: 5,914,921
[45] Date of Patent: *Jun. 22, 1999

[54] DISK DRIVE APPARATUS INITIALIZING OPTICAL HEAD DURING ACCELERATION OF DISK, DETECTING CONTROL INFORMATION AND ADJUSTING LIGHT EMISSION PRIOR TO DISK REACHING A CONSTANT SPEED OF ROTATION

[75] Inventor: Shigenori Yanagi, Kawasaki, Japan

[73] Assignee: Fujitsu Limited, Kawasaki, Japan

[ * ] Notice: This patent is subject to a terminal disclaimer.

[21] Appl. No.: 08/995,200

[22] Filed: Dec. 19, 1997

Related U.S. Application Data

[62] Division of application No. 08/348,782, Nov. 28, 1994, abandoned, which is a continuation of application No. 08/115,988, Sep. 3, 1993, abandoned, which is a continuation of application No. 07/584,350, Sep. 18, 1990, abandoned.

[30] Foreign Application Priority Data

Sep. 18, 1989 [JP] Japan .................................. 1-241294

[51] Int. Cl.⁶ .................................................. G11B 7/095
[52] U.S. Cl. .......................... 369/44.27; 369/50; 369/54; 369/116
[58] Field of Search ............................. 369/44.27, 44.29, 369/44.31, 47, 50, 116, 44.25, 44.28, 44.32, 49, 53, 54, 58

[56] References Cited

U.S. PATENT DOCUMENTS

| | | |
|---|---|---|
| 4,656,617 | 4/1987 | Nakatsuyama et al. . |
| 4,721,850 | 1/1988 | Sakai et al. . |
| 4,856,011 | 8/1989 | Shimada et al. . |
| 4,998,233 | 3/1991 | DiMatteo et al. . |
| 5,020,045 | 5/1991 | Smart et al. . |
| 5,042,020 | 8/1991 | Endo . |
| 5,187,696 | 2/1993 | Ishii et al. ............................. 369/58 X |
| 5,724,328 | 3/1998 | Yanagi ..................................... 369/50 |

FOREIGN PATENT DOCUMENTS

| | | |
|---|---|---|
| 164061 | 12/1985 | European Pat. Off. . |
| 164863 | 12/1985 | European Pat. Off. . |
| 289304 | 11/1988 | European Pat. Off. . |

OTHER PUBLICATIONS

Patent Abstracts of Japan, vol. 8, No. 282 (P–323)(1719) Dec. 22, 1984 for JP–A–59–148183 (Hitachi) of Aug. 24, 1984.
Interim Version of DIS 10089, ISO/IEC JPC1 Information Technology, SC23/WG1.JTC1/SC23 N 321, Jul. 1990, pp. 37–42.

Primary Examiner—W. R. Young
Attorney, Agent, or Firm—Staas & Halsey

[57] ABSTRACT

A disk drive apparatus includes a driving circuit which rotates a recording media having a disk shape, and a read/write head movable in a radial direction of the recording media and a vertical direction substantially perpendicular to a plane of the radial direction. The read/write head writes data on the recording media and reads data therefrom. The disk drive apparatus also includes an initialization unit which initializes the read/write head during a period until the recording media starts to rotate and the rotating speed of the recording media reaches a predetermined constant speed so that the disk drive apparatus is set to a read/write enable state where the read/write head is correctly positioned with respect to the recording media in order to correctly write data on the recording media and read data therefrom.

20 Claims, 10 Drawing Sheets

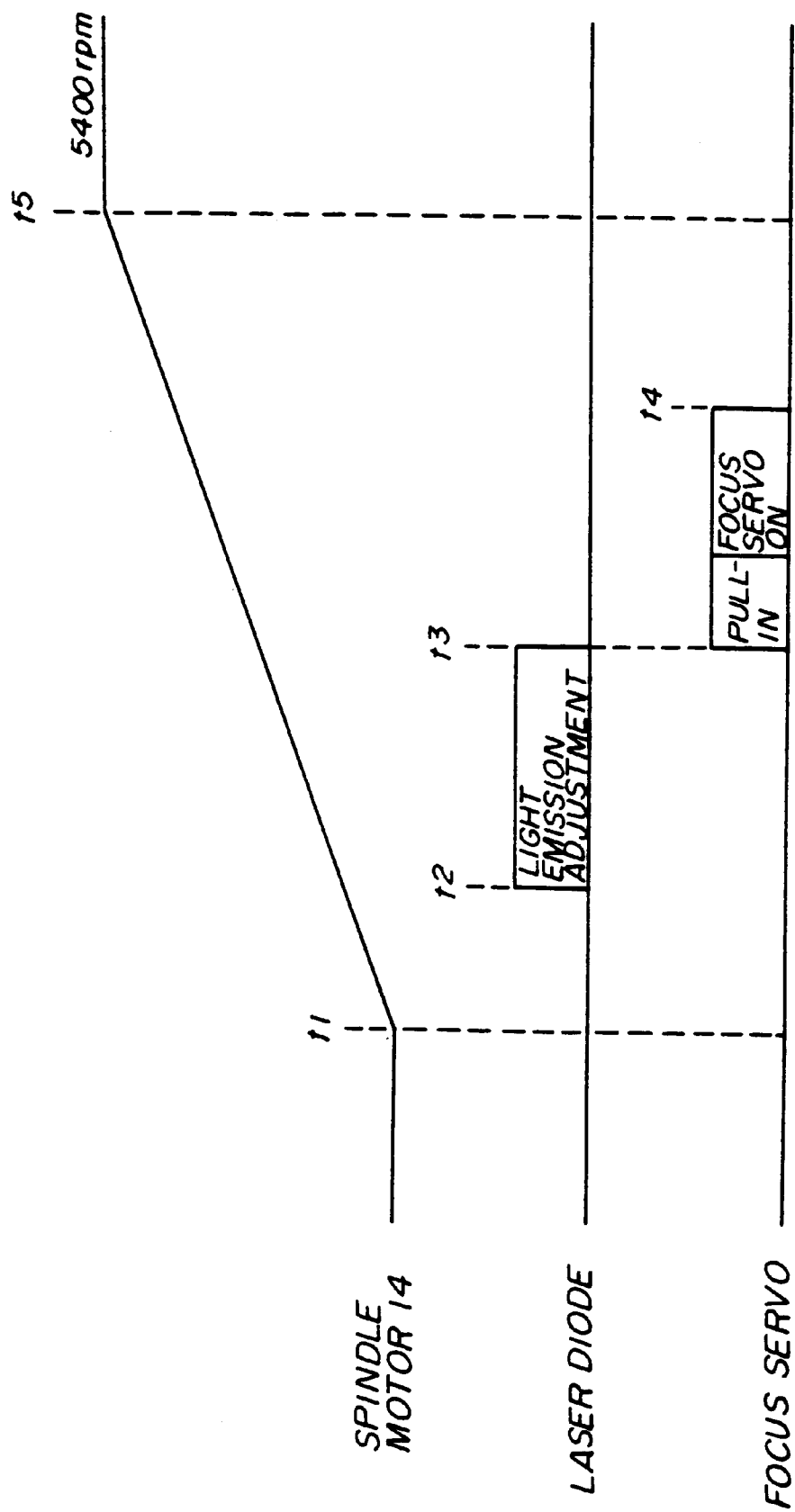

DISK DRIVE APPARATUS INITIALIZING OPTICAL HEAD DURING ACCELERATION OF DISK, DETECTING CONTROL INFORMATION AND ADJUSTING LIGHT EMISSION PRIOR TO DISK REACHING A CONSTANT SPEED OF ROTATION

The subject application is a divisional application of application Ser. No. 08/348,182 filed Nov. 28, 1994, now abandoned; which is a continuation application of application Ser. No. 08/115,988 filed Sept. 3, 1993, now abandoned; which, in turn, is a continuation application of application Ser. No. 07/584,350 filed Sept. 18, 1990, now abandoned.

BACKGROUND OF THE INVENTION

The present invention generally relates to a disk drive apparatus, and, more particularly, to an improvement of an initialization process by which the disk drive apparatus is set to a read/write enable state. More specifically, the present invention relates to a disk drive apparatus having a replaceable disk.

Various types of disk drive apparatuses are known. An optical disk drive apparatus or a magneto-optical disk drive apparatus has an extremely large storage capacity and is thus expected to be used as a large-capacity storage unit of a computer system. There is known an optical or magneto-optical disk drive apparatus which has a replaceable optical disk. An optical or magneto-optical disk is inserted into the disk drive apparatus through a disk loading mechanism where a spindle motor is in a stationary state. When the loading of the disk is completed, a loading complete detection signal is generated and output to the spindle motor. The rotating speed of the spindle motor starts to increase toward a constant speed equal to, for example, 3600 rpm. After the spindle motor reaches the constant speed, an initialization (adjustment) process is carried out.

As shown in FIG. 1, an initialization process including a first focusing adjustment, a phase encoded past read adjustment, a laser diode (LD) light emission adjustment and a second focusing adjustment is carried out after the rotating speed of the spindle motor reaches the constant speed. During both the first and second focusing adjustments, an object lens is moved within a predetermined range and a focus servo control is pulled in. During the focusing adjustment, a laser diode is adjusted so that a predetermined read power and write power are obtained. The PEP read adjustment determines whether or not PEP data recorded in a PEP zone as defined by the ISO/IEC DIS 10089 are correctly read out. After completing the above-mentioned adjustment processes, the disc drive apparatus is set to a read/write enable state (ready-ON state) where data is read out from or written on the disk.

However, conventional disk drive apparatuses as described above have the following disadvantage. As described above, the initialization process is carried out after the spindle motor starts to rotate at the constant speed, and the disk drive apparatus is set to the read/write state after the initialization process is completed. Thus, it takes a long time to obtain the read/write enable state. In the case where the rotating speed of the spindle motor is increased up to 1800 rpm, it takes about five seconds to obtain the read/write enable state.

SUMMARY OF THE INVENTION

It is a general object of the present invention to provide an improved disk drive apparatus in which the above-mentioned disadvantage is eliminated.

A more specific object of the present invention is to provide a disk drive apparatus having a reduced amount of time to obtain the read/write enable state after the spindle motor starts to rotate.

The above-mentioned objects of the present invention are achieved by a disk drive apparatus comprising: driving means for rotating a recording media having a disk shape; read/write head means, movable in a radial direction of the recording media and a vertical direction perpendicular to the radial direction, for writing data on the recording media and for reading data therefrom; and initialization means, coupled to the driving means and the read/write head means, for initializing the read/write head means during a period until the recording media starts to rotate and the rotating speed of the recording media reaches a predetermined constant speed so that the disk drive apparatus is set to a read/write enable state where the read/write head means is correctly positioned with respect to the recording media in order to correctly write data on the recording media and read data therefrom.

BRIEF DESCRIPTION OF THE DRAWINGS

Other objects, features and advantages of the present invention will become apparent from the following detailed description when read in conjunction with the accompanying drawings, in which:

FIG. 5 is a graph illustrating the operation of the disk drive apparatus according to the first embodiment of the present invention;

DESCRIPTION OF THE PREFERRED EMBODIMENTS

A description will now be given of the principle of a disk drive apparatus according to the present invention with reference to FIG. 2.

Figure 1:
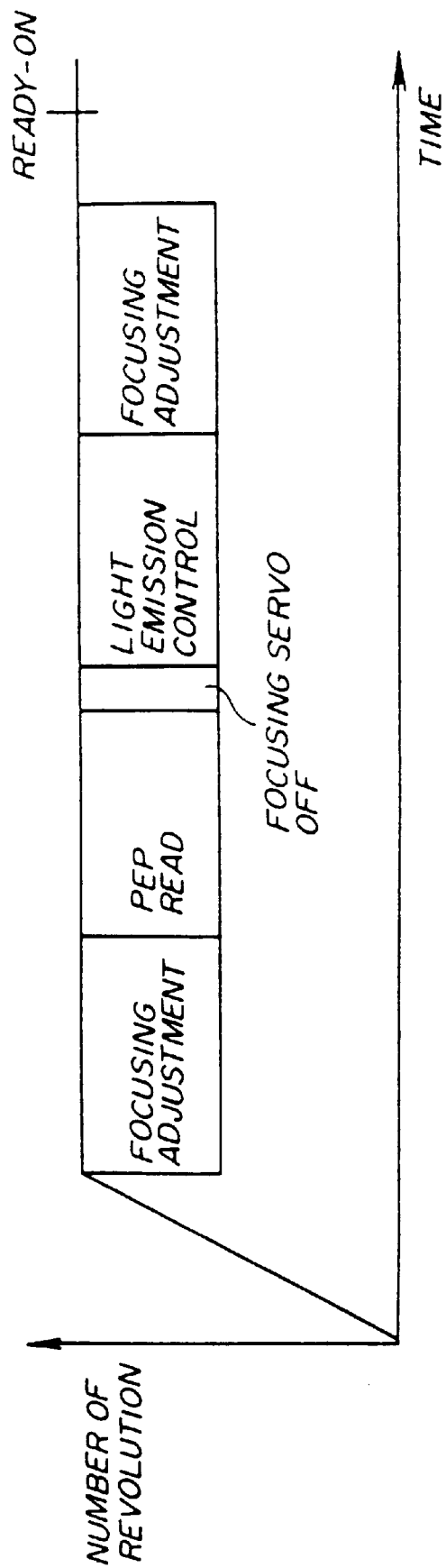
FIG. 1 is a graph illustrating a conventional initialization process.
Figure 2:
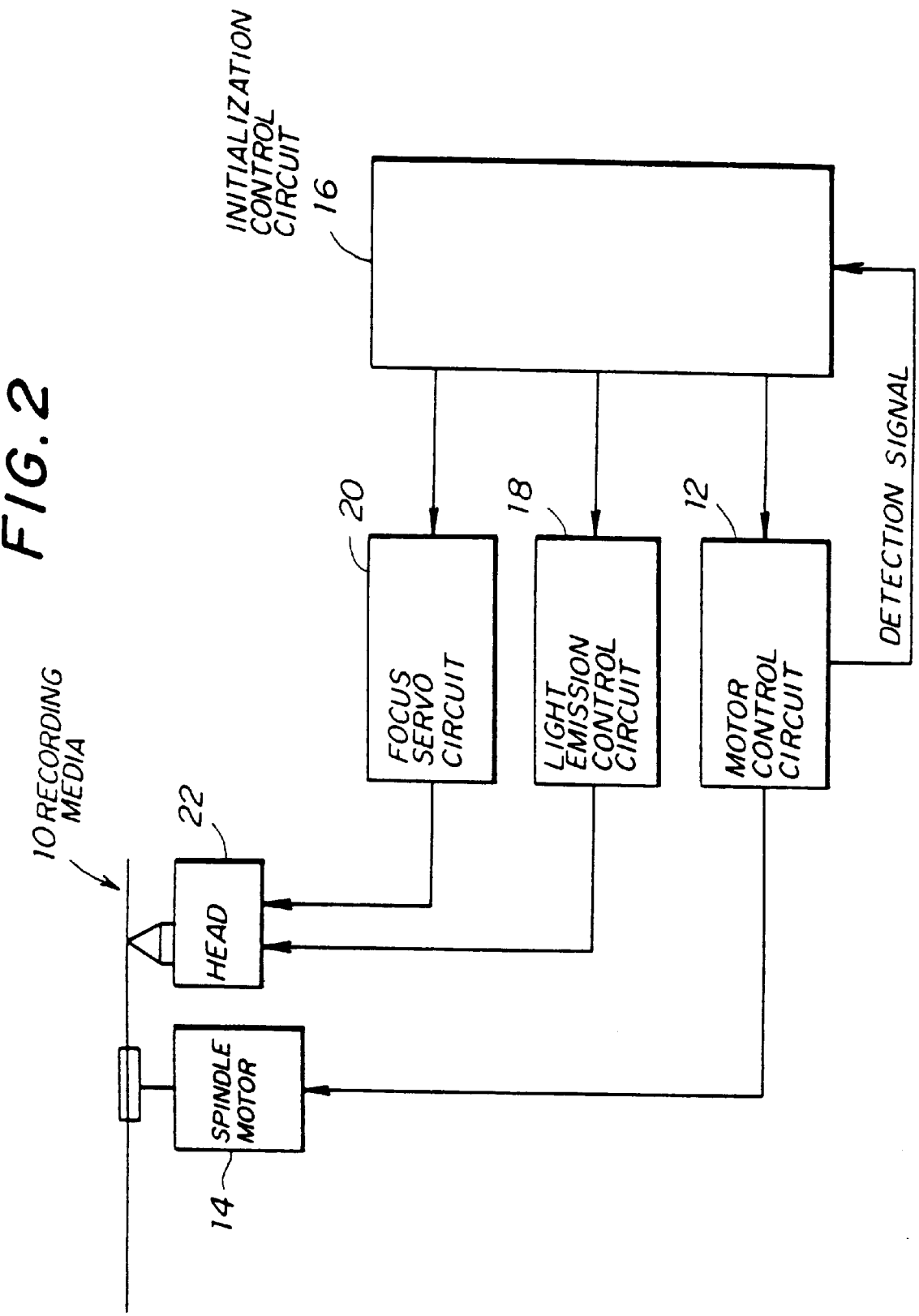
FIG. 2 is a block diagram of a disk drive apparatus according to the present invention.

Referring to FIG. 2, the disk drive apparatus has a recording media such as an optical disk or a magneto-optical disk, a motor control circuit 12, a spindle motor 14, an initialization control circuit 16, a light emission control circuit 18, a focus servo circuit 20 and a head 22. Under the control of the initialization control circuit 16, the motor control circuit 12 starts to rotate the spindle motor 14 when the disk 10 is loaded into the disk drive apparatus. The rotating speed of the spindle motor 14 increases and is monitored by the motor control circuit 12. Before the spindle motor 14 starts to rotate at a predetermined constant speed, the initialization control circuit 16 controls the light emission control circuit 18 and the focus servo circuit 20. The light emission control circuit 18 starts a light emission adjustment in which a laser diode built in the head 22 is adjusted to obtain a predetermined read power and write power. The focus serve circuit 20 starts a focusing adjustment in which an object lens built in the head 22 is moved so as to obtain a focus position. It will be noted that the light emission adjustment and the focusing adjustment are carried out and completed before the rotating speed of the spindle motor 14 has become equal to the predetermined constant speed. When the motor control circuit 12 detects a state where the rotating speed of the spindle motor 14 has become equal to the predetermined constant speed, it outputs a detection signal to the initialization control circuit 16. In response to the detection signal, the initialization control circuit 16 sets the disk drive apparatus to the read/write enable state (ready-ON state). Since the initialization process is carried out and completed before the rotating speed of the spindle motor 14 becomes equal to the predetermined constant speed, the amount of time it takes to obtain the read/write enable state is reduced.

Figure 3:
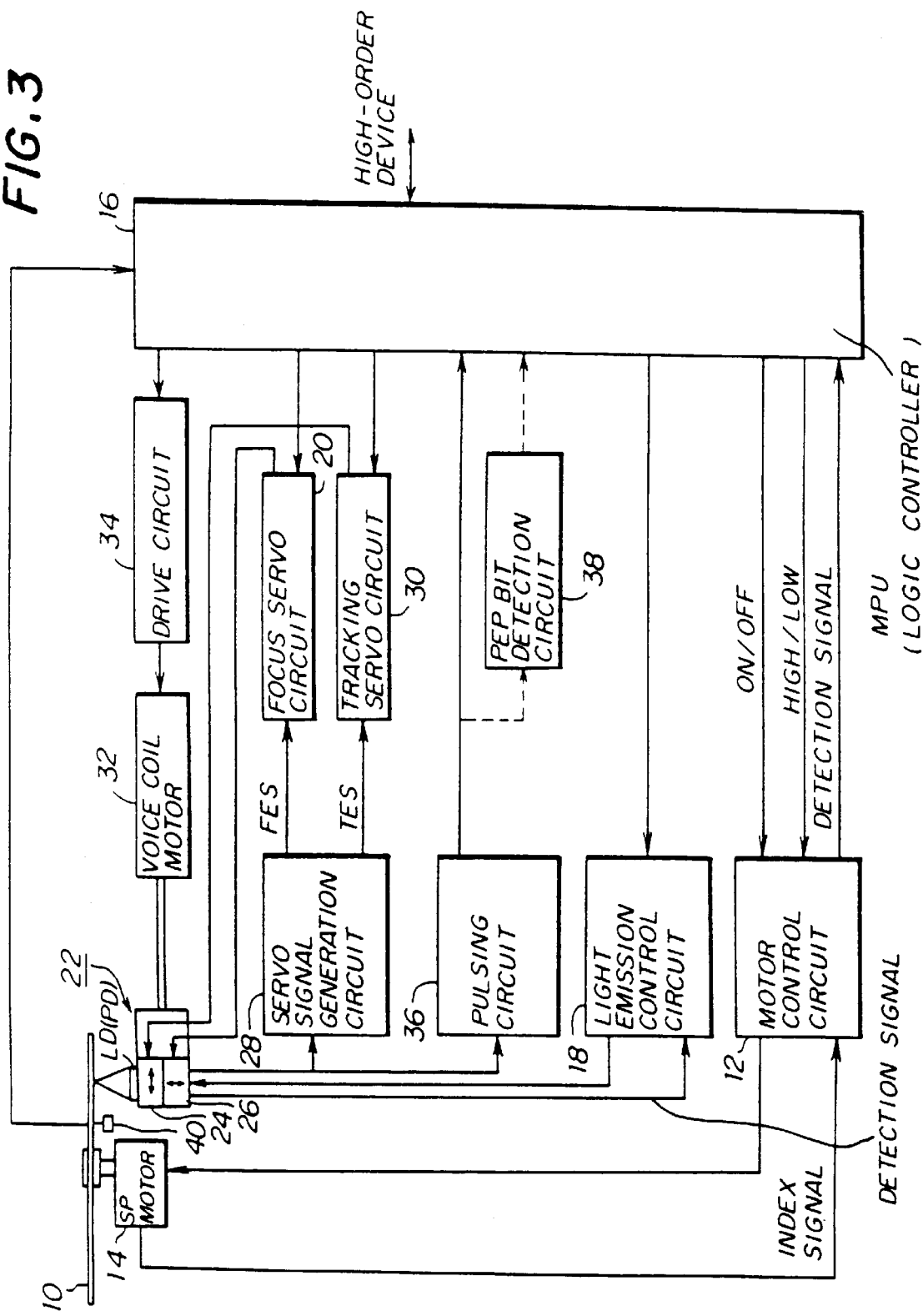
FIG. 3 is a detailed block diagram of the structure of the disk drive apparatus shown in FIG. 2.

A more detailed description will now be given of the disk drive apparatus with reference to FIG. 3. Referring to FIG. 3, the recording media 10 is formed of, for example, a 5-inch optical disk accommodated in a cassette which conforms to the ISO standard. When the optical disk 10 is inserted into the disk drive apparatus, a disk loading mechanism (not shown for the sake of simplicity) fixes the optical disk 10 to a rotating shaft of the spindle motor 14.

The spindle motor 14 is controlled by the motor control circuit 12. The spindle motor 14 is held stationary when the optical disk 10 is being loaded into the disk drive apparatus. When the loading of the optical disk 10 is completed, the disk loading mechanism outputs a loading complete detection signal to the initialization control circuit 16, which is implemented by a micro processor unit (logic controller) MPU. The MPU 16 outputs a motor ON signal to the motor control circuit 12, which activates the spindle motor 14. The spindle motor 14 is formed of, for example, a brushless DC motor. The motor control circuit 12 starts to rotate the spindle motor 14 and has the same rotation at a predetermined constant speed equal to, for example, 5400 rpm. More specifically, the motor control circuit 12 compares a reference clock signal which defines a rotating period corresponding to 5400 rpm with an index signal which shows the real rotating speed of the spindle motor 14, and executes a pulse width modulation (PWM) control in which a motor driving current is adjusted so that the phase difference between the reference clock signal and the index signal becomes zero.

The head 22 is formed of an optical head, which is mounted on a carriage and which includes a laser diode LD, a light-receiving element (photodiode) PD and an object lens (not shown for the sake of simplicity). The optical head 22 is driven in the radial direction of the optical disk 10 by a voice coil motor 32. Further, the optical head 22 includes a tracking actuator 24 and a focusing actuator 26. The tracking actuator 24 horizontally moves a light beam emitted from the laser diode within a predetermined range corresponding to a predetermined number of tracks in the radial direction of the optical disk 10. The focusing actuator 26 executes a focusing control in which the object lens (not shown) is moved in the axial direction of the spindle motor 14 so that a laser beam spot having a predetermined diameter is formed on a surface of the optical disk 10.

The voice coil motor 32 is driven by a drive circuit 34, which is supplied with a control signal generated and output by the MPU 16.

A read signal output from the optical head 22 is sent to a servo signal generation circuit 28, which derives a focusing error signal FES and a tracking error signal TES therefrom. The focusing error signal FES is sent to a focus servo circuit 20, which controls the focusing actuator 26 so that the focusing error signal FES is minimized. The tracking error signal TES is sent to the tracking servo circuit 30, which controls the tracking actuator 24 so that the tracking error signal TES is minimized. The focus servo circuit 20 and the tracking servo circuit 30 are enabled or disabled, that is, turned ON or OFF under the control of the MPU 16.

As has been previously mentioned, the optical head 22 has the laser diode LD. The laser diode LD emits different levels of power respectively during data write, read and erase procedures under the control of the light emission control circuit 18. The amount of the emitted light is detected by the photodiode PD provided in the optical head 22. A detection signal output by the photodiode PD is fed back to the light emission control circuit 18, which controls a driving current applied to the laser diode so that the difference between the detection signal and a target light emission amount defined respectively for the data write, read and erase operations is minimized.

Further, the read signal output from the optical head 22 is input to a pulsing circuit 36, which converts the read signal in analog form into a read pulse signal in digital form. The read pulse signal generated and output by the pulsing circuit 36 is input to the MPU 16, which demodulates read data from the read pulse signal.

It will be noted that a PEP bit detection circuit 38 and an inner sensor 40 are structural elements of a disk drive apparatus according to a second preferred embodiment of the present invention, which will be described in detail later.

Figure 4:
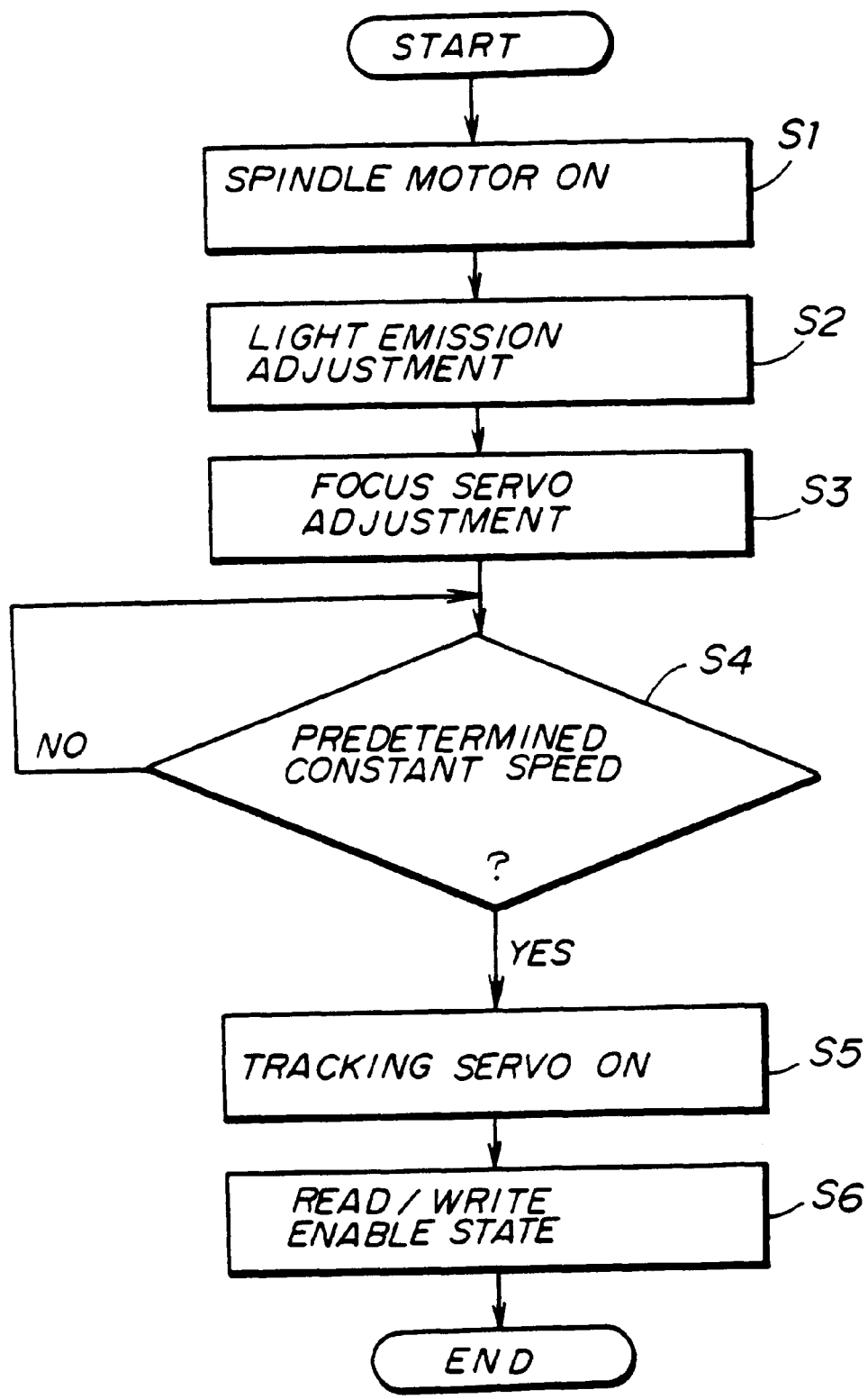
FIG. 4 is a flowchart illustrating the operation of the disk drive apparatus according to a first embodiment of the present invention.

A description with reference preferred embodiment without will now be given of the operation of the disk drive apparatus with the PEP bit detection circuit 38 and the inner sensor 40 It is now assumed that the optical disk 10 is removed from the disk drive apparatus and a new optical disk is loaded therein. The new optical disk 10 is fixed to the spindle shaft of the motor 14 by the loading mechanism (not shown for the sake of convenience). In response to the loading complete signal, the MPU 16 outputs the motor ON signal to the motor control circuit 12 (step S1 shown in FIG. 4). The motor control circuit 12 compares the phase of the reference clock signal corresponding to, for example, 5400 rpm with the index signal showing the real rotating speed. Initially, the index signal greatly lags behind the reference clock signal. Thus, the motor drive circuit 12 supplies the spindle motor 14 with a maximum current and, as shown in FIG. 5, the spindle motor 14 starts to rotate at time $t_1$.

After turning ON the spindle motor 14, the MPU 16 executes step S2, at which step the light emission adjustment is executed. The MPU 16 has information about reference light emission amounts which are provided respectively for the data write, read and erase operations and predetermined in accordance with the type of the optical disk 10. The light emission control circuit 18 receives light emission data sent from the MPU 16 for every access, and drives the laser diode by applying a driving current thereto in accordance with the received light emission data. The amount of light emitted by the laser diode respectively for the write, read and erase operations is based on the deviation between the light emission detection signal and the corresponding reference light-emitting amount. Thereby, it is possible to determine the appropriate driving currents provided respectively for the data write, read and erase operations in order to obtain the respective reference light emission amounts. As a result, it becomes possible to cancel errors in the properties of laser diodes themselves and other errors caused by the setting of laser diodes. The appropriate driving currents thus obtained are written into the light emission control circuit 18 and used when data is actually recorded on, read out from and erased from the optical disk 10. The above-mentioned light emission adjustment is carried out for a period between times $t_2$ and $t_3$ shown in FIG. 5.

The MPU 16 executes step S3, at which step the focus servo adjustment is carried out. During the focus servo adjustment, the MPU 16 activates the focus servo circuit 20, which drives the focusing actuator 26 to move the object lens within a predetermined focus search range equal to, for example, 1 mm and to seek a focus position where the focusing error signal FES generated and output by the servo signal generation circuit 28 during movement is minimized. When such a focus position is detected, the movement of the object lens is stopped and servo control by the focus servo control circuit 20 has been pulled in. The focus servo adjustment is carried out during a period between time $t_3$ and time $t_4$ shown in FIG. 5.

After completing the focus servo adjustment, the MPU 16 executes step S4, which determines whether or not the rotating speed of the spindle motor 14 has become equal to the predetermined constant speed equal to 5400 rpm. When the result at step S4 becomes YES, the MPU 16 executes step S5, at which step the MPU 16 turns ON the tracking servo circuit 30. During the tracking servo adjustment, the tracking servo circuit 30 controls the tracking actuator 24 so that the tracking error signal TES is minimized. After the tracking servo adjustment is completed, the MPU 16 sets the disk drive apparatus to the read/write enable state.

A description will now be given of a disk drive apparatus according to the second preferred embodiment of the present invention with the PEP bit detection circuit 38 and the inner sensor 40. As has been described previously, the disk drive apparatus has the structure obtained by adding the PEP bit detection circuit 38 and the inner sensor 40 to the structure of the disk drive apparatus according to the aforementioned first preferred embodiment of the present invention. The disk drive apparatus according to the second preferred embodiment reads data which is used for the light emission adjustment of step 52 and which is recorded on a PEP zone on the optical disk 10. Thus, the second embodiment of the present invention does not need the aforementioned reference light emission amounts which are provided respectively for the data write, read and erase operations and which are stored in the MPU 16. The rotating speed of the spindle motor 14 is increased to an intermediate speed which is less than the predetermined constant speed, and is then maintained at the intermediate speed, When the spindle motor 14 is rotating at the intermediate speed, PEP data recorded on the PEP zone is read out. After that, the rotating speed of the spindle motor 14 is increased toward the predetermined constant speed. During this time, the light emission adjustment of the laser diode provided in the optical head 22 is carried out on the basis of the readout PEP data.

Figure 8:
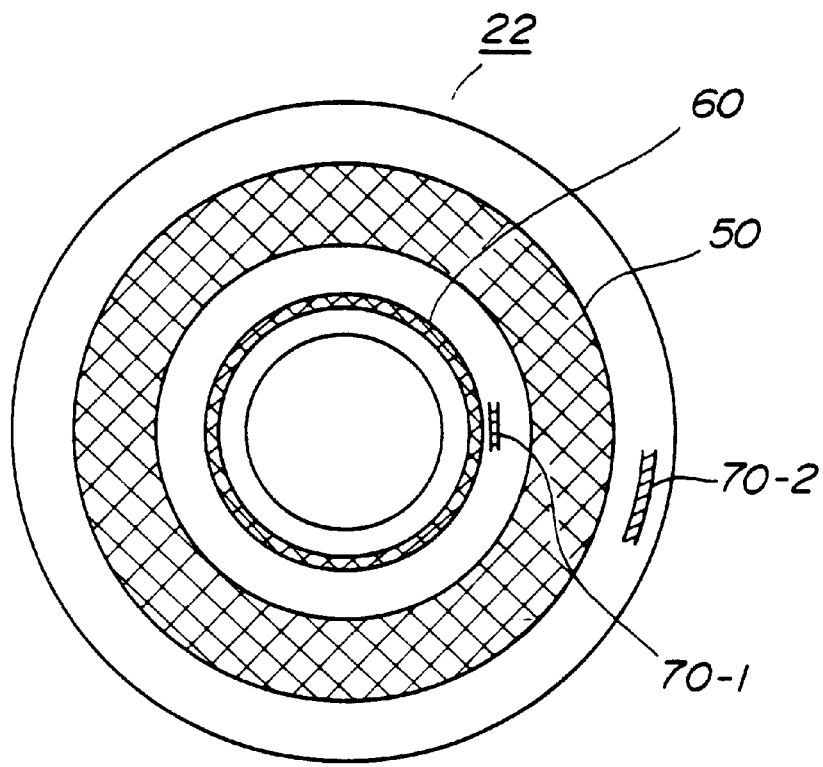
FIG. 8 is a diagram illustrating a storage area of an optical disk which is loaded into the disk drive apparatus according to the second embodiment of the present invention.

Referring to FIG. 8, there is illustrated a storage area of the optical disk 10 which has a PEP zone. The optical disk 10 has a user zone 50 and a PEP zone 60, which is located in an inner portion inside the user zone 50. A SFP zone 70-1 is provided between the user zone 50 and the PEP zone 60, and another SFP zone 70-2 is provided outside of the user zone 50. When it is impossible to read data from the SFP zone 70-1, data recorded on the SFP zone 70-2 is read out. The PEP zone 60 and the SFP zones 70-1 and 70-2 form control zones and data stored therein are called control data.

When the optical disk 10 is loaded into the disk drive apparatus, the PEP zone 60 is read first, the SFP zone 70-1 is then read (the SFP zone 70-2 is read if it is impossible to read the SFP zone 70-1), and the user zone 50 is finally accessed.

Information necessary to read data from the SFP zones 70-1 and 70-2 and the user zone 50 are recorded on the PEP zone 60. Such information contains the format of the optical disk 10, the modulation type, the number of bytes of user data in one sector, and the maximum value of read power used when the SFP zones 70-1 and 70-2 are read. Information necessary to read and write data on and from the user zone 50 is recorded on the SFP zones 70-1 and 70-2. Such information contains the maximum values of the read power, write power and erase power necessary for the light emission adjustment.

The PEP zone 60 will be read by the MPU 16 at the intermediate speed equal to, for example, 2700 rpm, which is half the predetermined constant speed equal to 5400 rpm. More specifically, phase modulated data is read out from the PEP zone 60 in the state where the spindle motor 14 is rotating at the intermediate speed. For this reason, the PEP zone 60 has a format different from the formats of the SFP zones 70-1 and 70-2, and the user zone 50. Of course, the modulation type of data to be recorded on the PEP zone 60 is different from that of data to be recorded on the user zone 50 or the SFP zones 70-1 or 70-2. From the above-mentioned point of view, the PEP bit detection circuit 38 is provided specifically for reading the PEP zone 60 and analyzes data read out from the PEP zone 60 in a conventional way.

It will be noted that recently a high-drivability motor has been manufactured. Such a high-drivability motor enables the optical disk 10 to rotate at a high speed equal to, for example, 5400 rpm. A conventional MPU does not have an operating speed sufficient to read the PEP data while the optical disk 10 is rotating. Thus, it is necessary to read the PEP data before the optical disk 10 reaches 5400 rpm.

Figure 9:
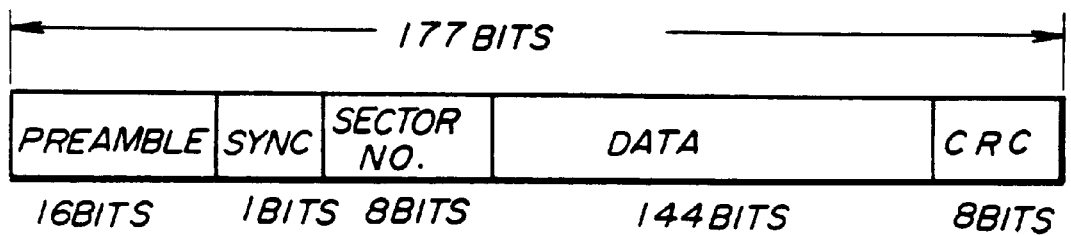
FIG. 9 is a diagram illustrating the format of a sector of a PEP zone on the optical disk shown in FIG. 8.
Figure 10:
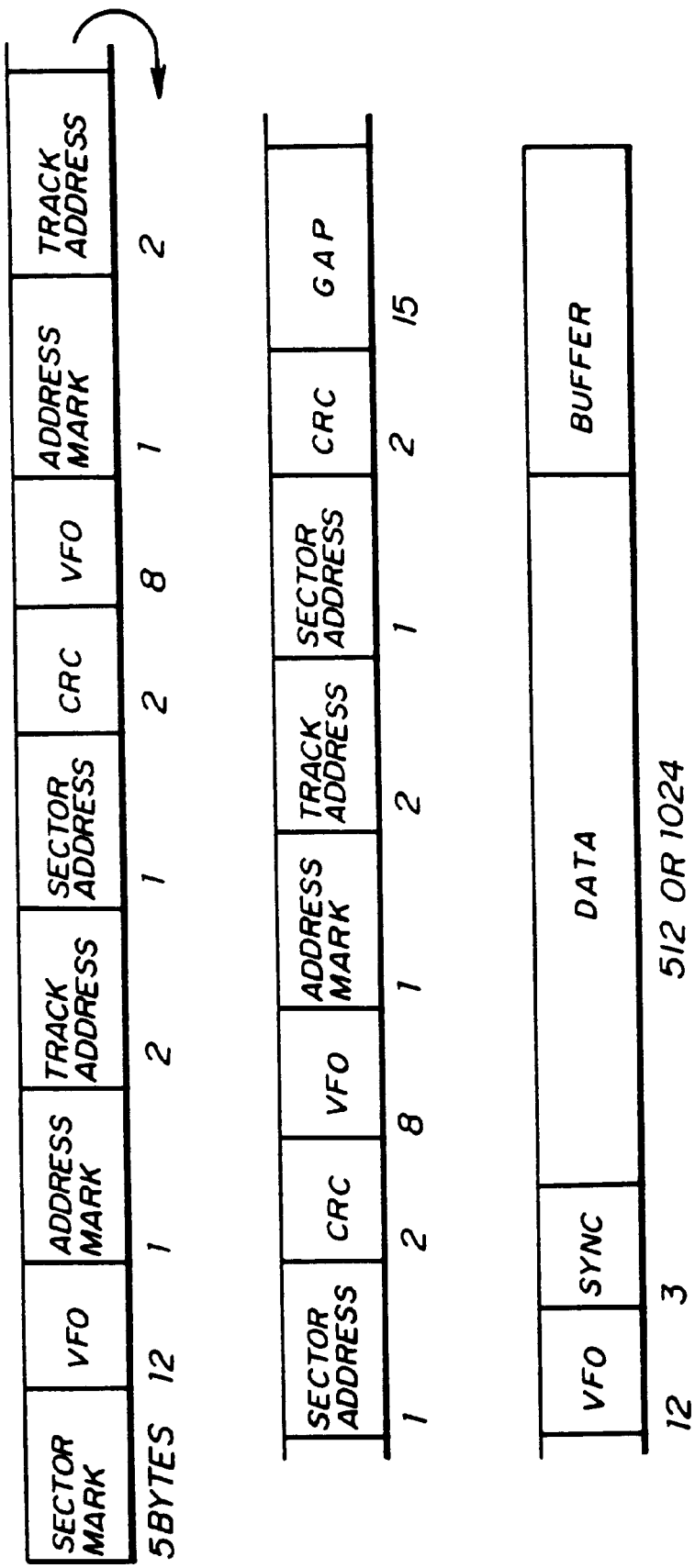
FIG. 10 is a diagram illustrating the format of a sector in a user zone on the optical disk shown in FIG. 8.

FIG. 9 illustrates the format of a sector of the PEP zone 60, and FIG. 10 illustrates the format of a sector of the user zone 50. The formats illustrated in FIGS. 9 and 10 are defined by the ISO/IEC DIS 10089, the disclosure of which is hereby incorporated by reference.

The inner sensor 40 is provided for detecting the movement position of the optical head 22 with respect to the PEP zone 60. When the rotating of the spindle motor 14 is started, the MPU 16 controls the voice coil motor 32 so that the optical head 22 moves toward the center of the optical disk 10 until the MPU 16 receives a detection signal output by the inner sensor 40. In response to the detection signal, the MPU 16 stops the movement of the optical head 22. At this position, the optical head 22 reads data recorded on the PEP zone 60. As is well known, the PEP zone 60 has a 500 $\mu$m-width ring-shaped track, which is different from a spiral track of the user zone 50. For this reason, there is no need to execute the tracking control during the time data is read out from the PEP zone 60.

Figure 6A:
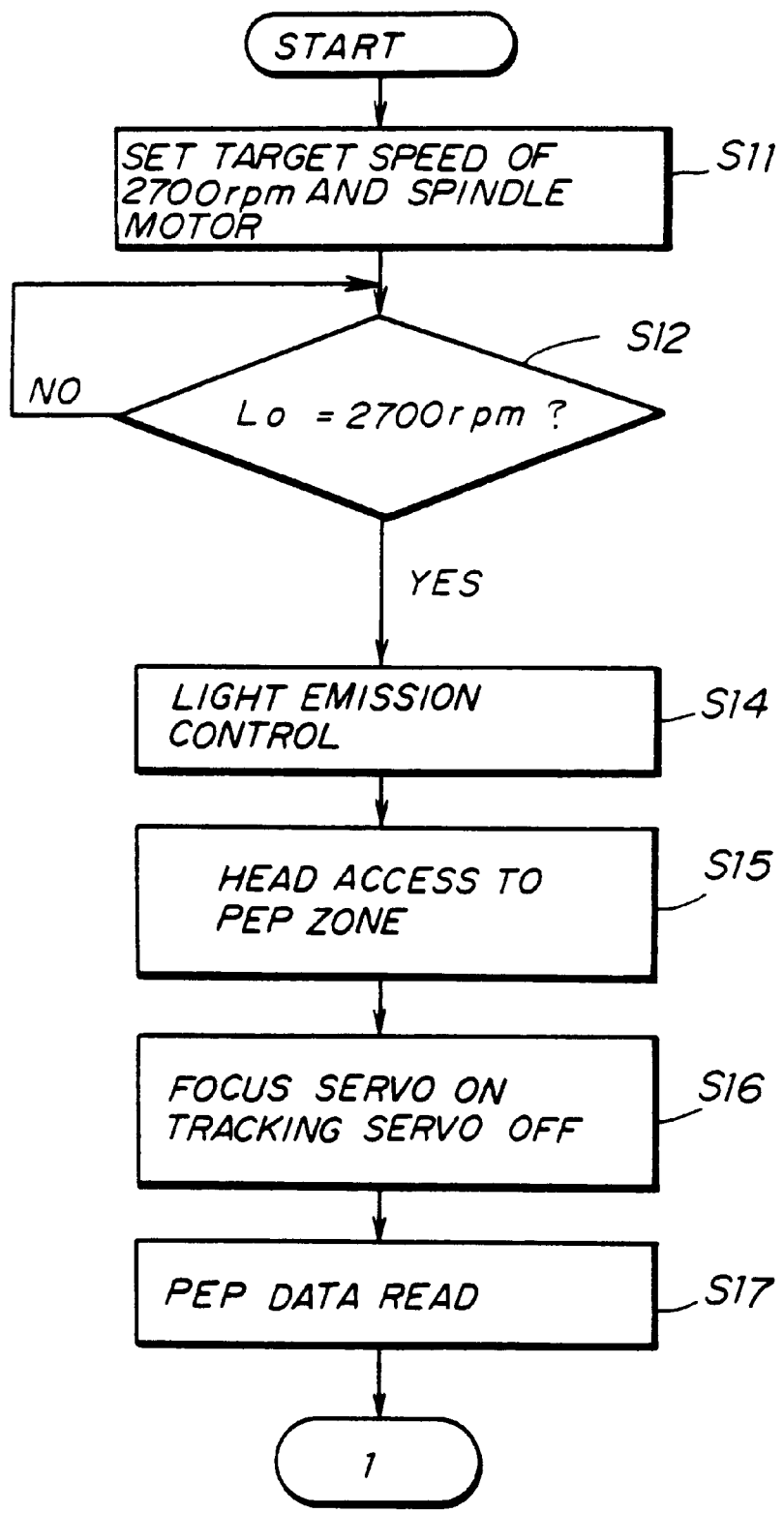
FIG. 6A and FIG. 6B are flowcharts illustrating the operation of the disk drive apparatus according to a second preferred embodiment of the present invention.
Figure 6B:
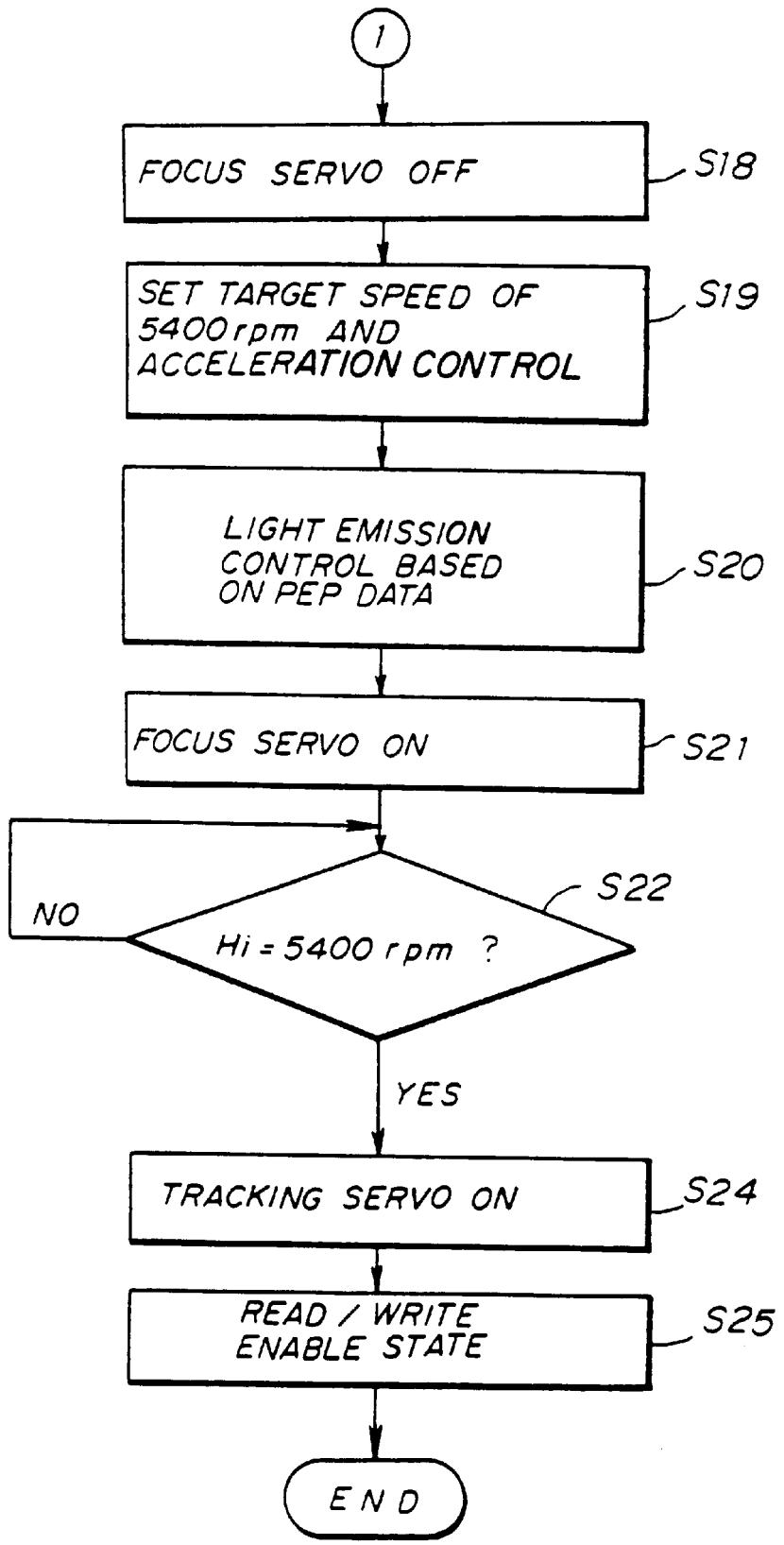
Figure 7:
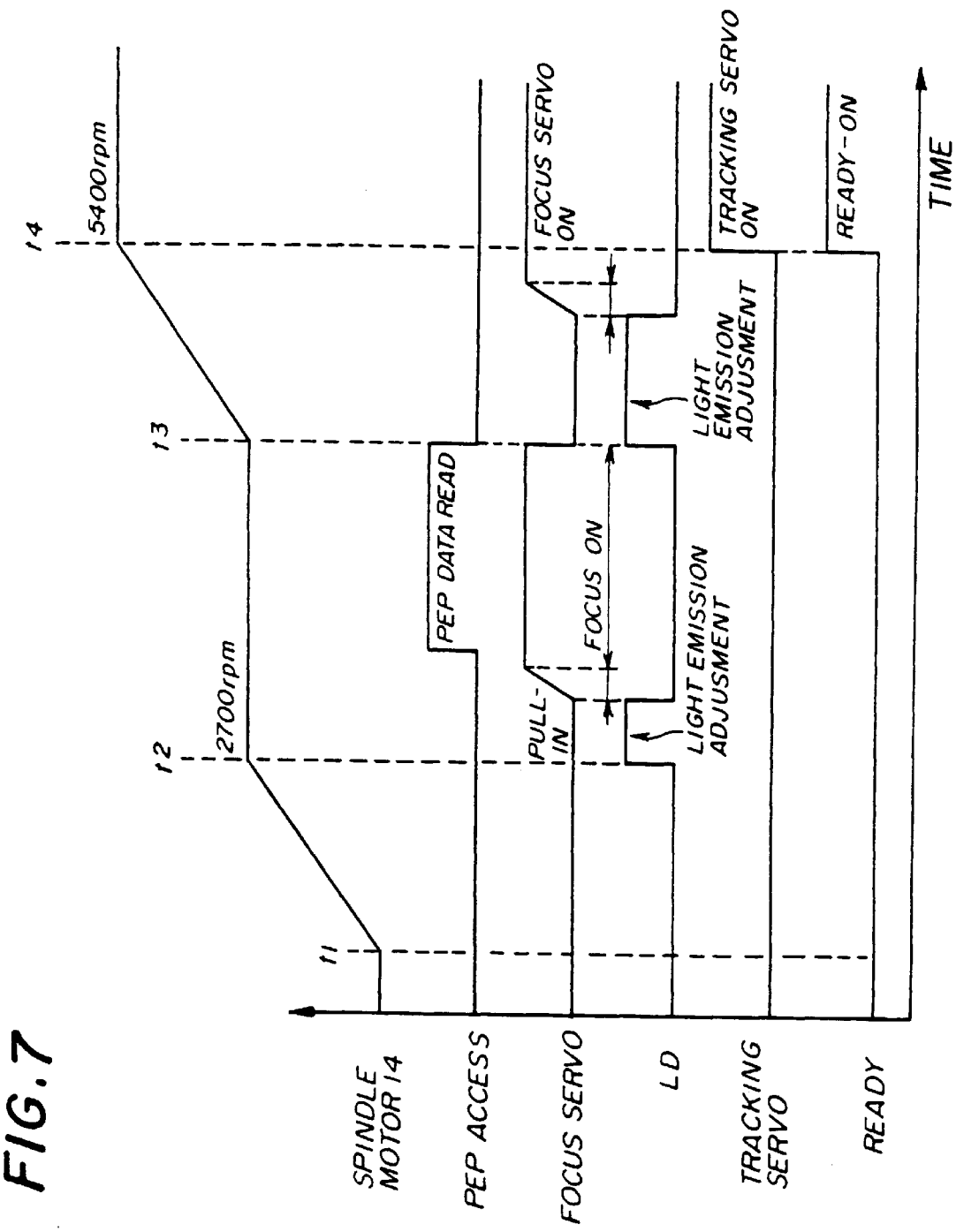
FIG. 7 is a graph illustrating the operation of the disk drive apparatus according to the second embodiment of the present invention.

A description will now be given of the operation of the disk drive apparatus according to the second preferred embodiment of the present invention with reference to FIGS. 6A, 6B and 7. When the loading of the optical disk 10 into the disk drive apparatus is completed, at step S11, the MPU 16 outputs the motor ON signal to the motor control circuit 12, which starts to rotate the spindle motor 14. At this time, the MPU 16 writes data indicative of a lower target speed Lo corresponding to the aforementioned intermediate speed equal to 2700 rpm into the motor control circuit 12. The motor control circuit 12 is formed of, for example, a conventional LSI for controlling a motor, which has a speed control terminal. The data indicative of the lower target speed Lo corresponds to, for example, a low level of the speed control terminal of the LSI. At step S12, the MPU 16 determines whether or not the rotating speed of the spindle motor 14 has become equal to 2700 rpm by comparing the phase of the index signal with the phase of a signal corresponding to the lower target speed Lo. When the result at step S12 becomes YES, the the spindle motor 14 rotates at the lower target speed. At step S14, the MPU 16 controls the light emission control circuit 18 so that the laser diode provided in the optical head 22 emits a low level of power necessary to read the PEP zone 60. During step S14, the aforementioned light emission adjustment for data read is carried out by the light emission control circuit 18. During step S14,, the light emission adjustment for adjusting the data write operation is not performed, so that it takes a short time to set the laser diode to the lower power level.

At step S15, the MPU 16 controls the drive circuit 34 and the voice coil motor 32 so that the optical head 22 is accessed to the PEP zone 60. When the detection signal output by the inner sensor 40 is input to the MPU 16, the MPU 16 stops the movement of the optical head 22. Of cocarry out step S15 at t carry out step S15 at the same time that step S11 is executed.

At step S16, the focus servo control is turned ON while the tracking control is kept OFF. It will be noted that the focus servo control is started when the light emission adjustment for obtaining data necessary to read PEP data from the PEP zone 60 is completed, as will be shown in FIG. 7. At step S17, data recorded on the PEP zone 60 is read out and sent to the PEP bit detection circuit 38 through the pulse generating circuit 36. The PEP bit detection circuit 38 outputs the PEP data to the MPU 16, which extracts, from the PEP data, information necessary to control the light emission control of the laser diode provided in the optical head 22, such as the maximum emission levels necessary to read the SFP zones 70-1 and 70-2.

At step S18, the MPU 16 instructs the focus servo circuit 30 so that the focus servo control is turned OFF. At step S19, the MPU 16 executes an acceleration control in which the MPU 16 switches the control signal terminal of the motor control circuit 12 from the low level to a high level. Thereby, the rotating speed of the spindle motor 14 increases toward an upper target speed Hi corresponding to the aforementioned predetermined constant speed equal to 5400 rpm.

At step S20 subsequent to step S19, the light emission control circuit 18 executes,the light emission adjustment for the data read operation on the basis of the PEP data. The optimum power of light needed for the data read operation is determined by the light emission control circuit 18. When the light emission control circuit 18 at step 20 is completed, the focus servo control is started. When the focus servo control is pulled in and settled, the focus servo control becomes ON at step S21. At step S22, the MPU 16 determines whether or not Hi =5400 rpm. Then the result at step S22 becomes YES, the spindle motor 14 is controlled so as to rotate at the speed of 5400 rpm. At step S24, the MPU 16 turns ON the tracking servo control, so that the disk drive apparatus is set to the read/write enable state at step 25.

It takes approximately 4 seconds to obtain the read/write enable state according to the second preferred embodiment of the present invention which is designed to rotate the optical disk 10 at 5400 rpm.

Several variations of the second embodiment of the present invention can be made. In the second embodiment of the present invention, in order to obtain the appropriate read power of light for reading the SFP zones 70-1 and 70-2, the PEP zone 60 is read while the spindle motor 14 is rotating at 2700 rpm. Alternatively, it is possible to read the SFP zones 70-1 and 70-2 while the spindle motor 14 is rotating at 2700 rpm, respectively adjust read power, write power and erase power of the laser diode on the basis of the information read out from the SFP zones 70-1 and 70-2 and then increase the rotating speed of the spindle motor 14 up to 5400 rpm.

The adjustments before the rotating speed of the optical disk 10 reaches 5400 rpm are not limited to the light emission adjustment control and the focusing adjustment. It is possible to carry out an adjustment which does not need the predetermined constant speed (upper target speed) during the adjustment procedure. For example, it is possible to adjust the voice coil motor 32 before the rotating speed of the optical disk 10 becomes equal to the predetermined constant speed. In this case, a test seeking to obtain offset information and acceleration information is carried out. After the rotating speed of the optical disk 10 becomes equal to the predetermined constant speed, the voice coil motor 32 is controlled on the basis of the obtained offset information and the acceleration information. It is necessary to prevent the above test seeking from being carried out at the same time as the PEP data is read.

The intermediate and predetermined constant speeds are not limited to 2700 rpm and 5400 rpm, respectively.

The present invention is not limited to the specifically disclosed embodiments, and variations and modifications may be made without departing from the scope of the present invention.

What is claimed is:

1. A disk drive apparatus for operating on a disk shaped recording medium having a user area storing user data in a first format and a control area storing control information, necessary to read the user data, in a second format different from the first format, said apparatus comprising:

driving means for driving the recording medium in rotation, including accelerating from a rest, non-rotating condition to a predetermined constant speed of rotation;

optical head means, selectively movable in each of a radial direction of the recording medium and a vertical direction substantially perpendicular to a plane of the recording medium, for emitting light onto the recording medium and detecting the amount of light reflected by the recording medium and outputting a corresponding signal representative of the user data and of the control information;

initialization means, coupled to said driving means and said optical head means, for initializing said optical head means before the rotating speed of the recording medium reaches the predetermined constant speed of rotation, wherein said initialization means comprises:

initial light emission means for emitting light of an initial amount;

detecting means, operative after the light is emitted by the initial light emission means, for detecting the control information based on the corresponding signal output by said optical head means;

light adjusting means, responsive to the detected control information, for adjusting the amount of light emitted from said optical head means in accordance with the detected control information; and focus servo means, responsive to the amount of light having been adjusted by the light adjusting means in accordance with the detected control information, for positioning said optical head means in the vertical direction so that an appropriate spot is formed on the recording medium by the light emitted thereon by the optical head means.

2. A disk drive apparatus as claimed in claim 1, further comprising control means for controlling said driving means so that after the detecting means detects the control information, the speed of rotation of said recording media continuously increases up to said predetermined constant speed.

3. A disk drive apparatus as claimed in claim 1, further comprising tracking servo means for positioning said optical head means in the radial direction so that said optical head means is correctly positioned for operating with respect to a selected track on the recording medium.

4. A disk drive apparatus as claimed in claim 3, wherein said initialization means further comprises means for activating said tracking servo means when the speed of rotation of said recording medium reaches said predetermined constant speed.

5. A disk drive apparatus as claimed in claim 1, wherein:
said disk drive apparatus further comprises motor means for driving said optical head means in the radial direction; and
said initialization means further comprises means for obtaining status information concerning movement of said optical head means before the speed of rotation of the recording medium reaches the predetermined constant speed.

6. A disk drive apparatus as claimed in claim 1, wherein the recording medium comprises an optical disk.

7. A disk drive apparatus as claimed in claim 1, wherein the recording medium comprises a magneto-optical disk.

8. A disk drive apparatus as recited in claim 1, wherein the control area storing control information is a PEP zone.

9. A method of disk drive control, said method comprising the steps of:

(a) accelerating a disk shaped recording medium from a rest condition and until a speed of rotation of the recording medium reaches a predetermined constant speed of rotation, the recording medium having a user area storing user data in a first format and a control area storing control information, necessary to read the user data, in a second format different from the first format;

(b) emitting light from an optical head onto the recording medium and detecting the amount of light reflected by the recording medium and outputting a corresponding detected light signal;

(c) detecting the control information based on the corresponding detected light signal;

(d) adjusting an amount of light emitted from the optical head onto the recording medium so that the amount of light emitted becomes equal to a predetermined level in accordance with the detected control information, during rotation of the recording medium but before the speed of rotation of the recording medium reaches the predetermined constant speed of rotation in step (a);

(e) focusing the optical head so that an appropriate spot of light is formed on the recording medium, after said adjusting of the amount of light in step (d) and before the speed of rotation of the recording medium reaches the predetermined constant speed of rotation in step (a);

(f) performing tracking servo adjustment of a position of the optical head after the speed of rotation of the recording medium reaches the predetermined constant speed in step (a); and (g) performing read/write operations after said performing of the tracking servo adjustment in step (f).

10. A method of disk drive control as recited in claim 9, wherein the control area storing control information is a PEP zone.

11. A disk drive apparatus for operating on a disk shaped recording medium having a user area storing user data in a first format and a control area storing control information, necessary to read the user data, in a second format different from the first format, the apparatus comprising:

driving means for rotating the disk shaped recording medium in rotation including accelerating the disk from a rest, non-rotating condition to a predetermined constant speed of rotation;

optical head means for emitting an amount of light onto the disk shaped recording medium at a selected position and for receiving light reflected from the user and control areas of the disk shaped recording medium and detecting the received, reflected light to provide user data and control information detected outputs, respectively; and initialization means for controlling acceleration of the disk shaped recording medium until the speed of rotation of the recording medium reaches a predetermined constant speed of rotation, adjusting an amount of light emitted onto the recording medium so that the amount of light emitted becomes equal to a predetermined level in accordance with the control information, detected from the received, reflected light, before the speed of rotation of the recording medium reaches the predetermined constant speed of rotation, focusing the optical head so that an appropriate spot of light is formed on the recording medium after adjusting the amount of light and before the speed of rotation of the disk shaped recording medium reaches the predetermined constant speed of rotation, adjusting a position of the light beam spot on the recording medium after the speed of rotation of the disk shaped recording medium reaches the predetermined constant speed of rotation, and performing read/write operations after completion of the adjustment of the position of the light beam spot.

12. A disk drive apparatus for operation on a disk shaped recording medium as recited in claim 11, wherein the control area storing control information is a PEP zone.

13. A disk drive apparatus for performing data read, write, and erase operations on a recording medium of a disk shape, having a user area storing user data in a first format and a control area storing control information, necessary to read the user data, in a second format different from the first format, the disk drive apparatus comprising:

a drive mechanism having a motor energized by a supply of current for driving the recording medium in rotation and requiring a prescribed time interval, from an initial supply of the current to the motor, for the recording medium to accelerate from a rest condition to a specified, constant speed of rotation;

a sensor producing an index signal as an output thereof, representing the speed of rotation of the recording medium;

an optical head, selectively movable in each of a radial direction of the recording medium and a vertical direction substantially perpendicular to a plane of the recording medium and emitting a light beam onto the recording medium, the recording medium reflecting the light beam and the optical head receiving the reflected light beam and outputting corresponding control information and user data signals representative, respectively, of control information and user data stored in, and read by the light beam from, the user area and the control area, respectively, of the medium;

a light detector producing an output signal representative of the light emission level of the light beam emitted by the optical head; and a controller selectively controlling the current supplied to the drive mechanism and responsive to the index signal for accelerating the recording medium from the rest condition and to the specified constant speed of rotation over the prescribed time interval and maintaining the specified, constant speed of rotation thereof during the data write, read and erase operations on the recording medium and, further, while the medium is accelerating and in response to the light emission output of the light detector corresponding to the control information detected from the control area, the controller controlling the light emission level of the light beam emitted by the optical head and, upon completion of the adjustment of the amount of light, adjusting the position of the optical head in a vertical direction relatively to the recording medium to focus the light beam and form a light spot of an appropriate size on the recording medium prior to an end of the prescribed time interval.

14. A disk drive apparatus as recited in claim 13, wherein the controller, in response to insertion of a recording medium into the drive mechanism, initiates the supply of current to the motor for accelerating the recording medium from the rest condition.

15. A disk drive apparatus as recited in claim 13, wherein the controller further comprises:

a source of a reference signal corresponding to the predetermined constant speed of rotation; and a comparator comparing the index signal with the reference signal and producing an output indicating any difference between the speed of rotation indicated by the index signal and the speed of rotation represented by the reference signal.

16. A disk drive control method for disk shaped recording media of plural different types, each recording medium being driven in rotation and scanned by a light beam for operating thereon as to user data in accordance with selectively writing, and thereby recording, user data thereon and for reading and erasing user data previously recorded thereon, the plural different types of recording media respectively having plural different light emission levels of the light beam required for said operating on the recording medium as to user data and having respective control areas storing plural different control information specifying the respective light emission levels required for the plural different types of recording media, each in a format different from the user data format of the associated recording medium, the method comprising:

(a) controlling the speed of rotation of a selected recording medium in accordance with:

(a1) in a first time interval, accelerating the selected recording medium from a condition of non-rotation to a fixed speed of rotation specified for said operating on the recording medium as to user data, and (a2) during a successive, second time interval, maintaining the selected recording medium at the fixed speed of rotation specified for said operating on the recording medium as to user data; and (b) during step (a1), reading the control information from the selected recording medium and, in accordance therewith, adjusting the light emission level of the light beam to the required light emission level, specified by the control information, for said operating on the recording medium as to user data.

17. A method as recited in claim 16, further comprising adjusting the radial position of the light beam relatively to the recording medium at the fixed speed of rotation thereof during the second time interval of step (a2).

18. A method as recited in claim 16, further comprising, in succession and prior to step (b):

performing focus pull-in for focusing the light beam on the recording medium; and initiating focus servo control of the pulled-in light beam.

19. A method as recited in claim 18, further comprising performing the focus pull-in and turning ON the focus servo prior to the recording medium reaching the fixed speed of rotation in step (a1).

20. A method as recited in claim 19, further comprising, in step (b) with the recording medium at the fixed speed of rotation, activating a tracking servo to perform a tracking servo adjustment and thereafter establishing a read/write enable state for enabling operating on the recording medium as to user data.

* * * * *